(12) United States Patent
Lakshmikumar et al.

(10) Patent No.: US 9,817,203 B2
(45) Date of Patent: Nov. 14, 2017

(54) METHOD AND APPARATUS FOR OPTICAL ALIGNMENT

(71) Applicants: Arvind Lakshmikumar, Bangalore (IN); Ankit Kumar, Bangalore (IN); Vishal Dugar, Kolkata (IN); Sridhar Srinivasan Iyengar, Bangalore (IN)

(72) Inventors: Arvind Lakshmikumar, Bangalore (IN); Ankit Kumar, Bangalore (IN); Vishal Dugar, Kolkata (IN); Sridhar Srinivasan Iyengar, Bangalore (IN)

(*) Notice: Subject to any disclaimer, the term of this patent is extended or adjusted under 35 U.S.C. 154(b) by 42 days.

(21) Appl. No.: 14/809,205

(22) Filed: Jul. 25, 2015

(65) Prior Publication Data

US 2016/0025948 A1 Jan. 28, 2016

Related U.S. Application Data

(60) Provisional application No. 62/029,338, filed on Jul. 25, 2014.

(51) Int. Cl.
| H04N 13/02 | (2006.01) |
| G02B 7/00 | (2006.01) |
| G02B 5/04 | (2006.01) |
| H04N 5/225 | (2006.01) |

(52) U.S. Cl.
CPC ............. *G02B 7/003* (2013.01); *G02B 5/045* (2013.01); *H04N 5/2254* (2013.01); *H04N 13/0239* (2013.01); *H04N 13/0242* (2013.01)

(58) Field of Classification Search
CPC ............. H04N 5/2254; H04N 13/0242; H04N 13/0239
See application file for complete search history.

(56) References Cited

U.S. PATENT DOCUMENTS

| 6,111,701 A * | 8/2000 | Brown ............... G02B 27/0025 359/634 |
| 6,674,574 B1 * | 1/2004 | Aono ................... G02B 21/025 250/201.3 |
| 2007/0247517 A1 | 10/2007 | Zhang et al. |
| 2013/0107072 A1 | 5/2013 | Kumar et al. |
| 2014/0285650 A1 * | 9/2014 | Ishiwata ............ G06K 9/00127 348/79 |

FOREIGN PATENT DOCUMENTS

EP    1797523    6/2007

* cited by examiner

*Primary Examiner* — Tony Ko
(74) *Attorney, Agent, or Firm* — Geoffrey Gelman (57) ABSTRACT

Various embodiments include methods, systems, and apparatus for optically aligning multiple sensors in a multi-sensor electro-optical (EO) system. Various embodiments include ways of aligning these sensors using a combination of optical elements.

5 Claims, 8 Drawing Sheets

METHOD AND APPARATUS FOR OPTICAL ALIGNMENT

RELATED APPLICATIONS

The present applications claims the benefit of priority of U.S. Provisional Application No. 62/029,338, entitled "METHOD AND APPARATUS FOR OPTICAL ALIGNMENT", and filed Jul. 25, 2014, the entirety of which is hereby incorporated by reference herein for all purposes.

BACKGROUND

Multi-sensor electro-optical (EO) systems may require the fusion of two or more images, e.g., so as to improve overall image quality or detail.

Traditional fusion systems employ complex processing to obtain proper alignment between the different input images. This may include image processing techniques of feature matching to calculate disparities. Such methods are computationally expensive and are not suitable for low power systems (e.g., EP1797523 A2)

Complex processing consumes a lot of power, which severely limits the portability of such systems, e.g. in a handheld unit. The presence of large batteries once again makes the device extremely cumbersome Digital methods of image alignment are imperfect, especially when dealing with multi-spectral input. For instance, the input from an infrared sensor and day sensor would contain very different texture information, making accurate registration difficult.

Heavy processing requirements drive up the cost for commercial units

Mechanical methods of aligning sensors to eliminate angular (yaw, pitch, roll) errors between them also suffer from inaccuracies. Moreover, mechanical systems tend to lose alignment over time, especially during rugged outdoor use, and re-alignment of the sensors is very difficult. The presence of multiple components that have to be accurately aligned (lens assembly, mirrors, CCD sensors etc.) compounds the problem even more.

SUMMARY

Various embodiments include methods, systems, and apparatus for optically aligning multiple sensors in a multi-sensor electro-optical (EO) system.

Various embodiments include ways of aligning these sensors using a combination of optical elements. For EO systems including multiple sensors such as visible, infrared (IR), mid wave infrared (MWIR), long wave infrared (LWIR), Laser Range Finder (LRF) or Laser Designator (LD), it may be desirable to align the sensors such that their optical axes are parallel so that one can achieve maximum overlap. The state-of-the-art multi-sensor EO systems also employ image fusion technology to improve situational awareness. Image fusion may require images to be first aligned so that fusion algorithms can fuse complementary features from multiple sensors. Even small errors in angular alignment can lead to large unpredictable disparities and parallax error in the input images. Similarly, it may be desirable to align an LRF or LD with a Visible/Thermal sensor. Without alignment, the actual pointer of an LRF/LD may be widely shifted in the Visible/Thermal sensor. Various embodiments outline methods to correct for alignment errors by means of a combination of optical elements including, but not limited to, various kinds of prisms, lenses and mirrors.

DETAILED DESCRIPTION

Various embodiments provide for a combination of optical elements placed in the optical path of one or more sensors. These optical elements are used to deviate incoming electromagnetic radiation and thus compensate for the misalignment between different sensors.

Various embodiments employ one or more rotating prism-pairs placed in the optical path of one or more sensors. A prism-pair is mounted so as to enable relative rotation between the two prisms.

In various embodiments, a prism-pair may be mounted to a rod oriented along the common axis of the prisms. The rod may be anchored at one or both ends to a housing. The housing may enclose the prism pair. The housing may additionally enclose one or more other components described herein. In various embodiments, each prism may be free to rotate about the rod.

By rotating one or both prisms, an incident beam of electromagnetic radiation can be deflected along every angle in a cone dependent on the prism-angle of the prisms and the refractive index of the material used. This deflection is used to compensate for the angular alignment errors between the sensors. Once the angular alignment errors have been eliminated, basic digital processing can be used to accurately fuse multiple images.

Utilizing optical elements may reduce or eliminate the need for complex image registration techniques to correct for angular alignment errors. This may reduce processing requirements and power consumption of the overall system Most digital registration techniques rely on some form of interpolation (e.g. bilinear) to rotate an image and correct for angular misalignment. Interpolation operations lead to decreased image quality and loss of information, since they approximate pixel values based on neighboring pixels. Embodiments described herein, however, may preserve image quality and information, and even completely preserve image quality and information, by deviating the incident electromagnetic rays themselves before they fall onto the corresponding sensor.

Mechanically aligned systems tend to lose alignment over time, especially during rugged use, and re-alignment may be difficult, even extremely difficult. Such systems usually have specialized mechanical cradles for individual sensors that allow rotations around two or three axes, and the rotations are achieved by means of multiple adjustment screws. Therefore, the entire sensor (which can often be bulky) must be moved in order to achieve alignment. In contrast, in various embodiments, an optical-element based system can be quickly realigned to correct for changing sensor orientations. In various embodiments outlined herein, one only needs to rotate the prisms, which may be less bulky (even far less bulky) than the sensors themselves. There is also no need to adjust multiple cradles for alignment.

Moreover, in various embodiments, a prism-pair achieves deviations along two axes by rotation around a single axis, whereas a mechanical system would need to be rotated along both axes to achieve the same deviation. This may reduce system complexity.

Figure 1:
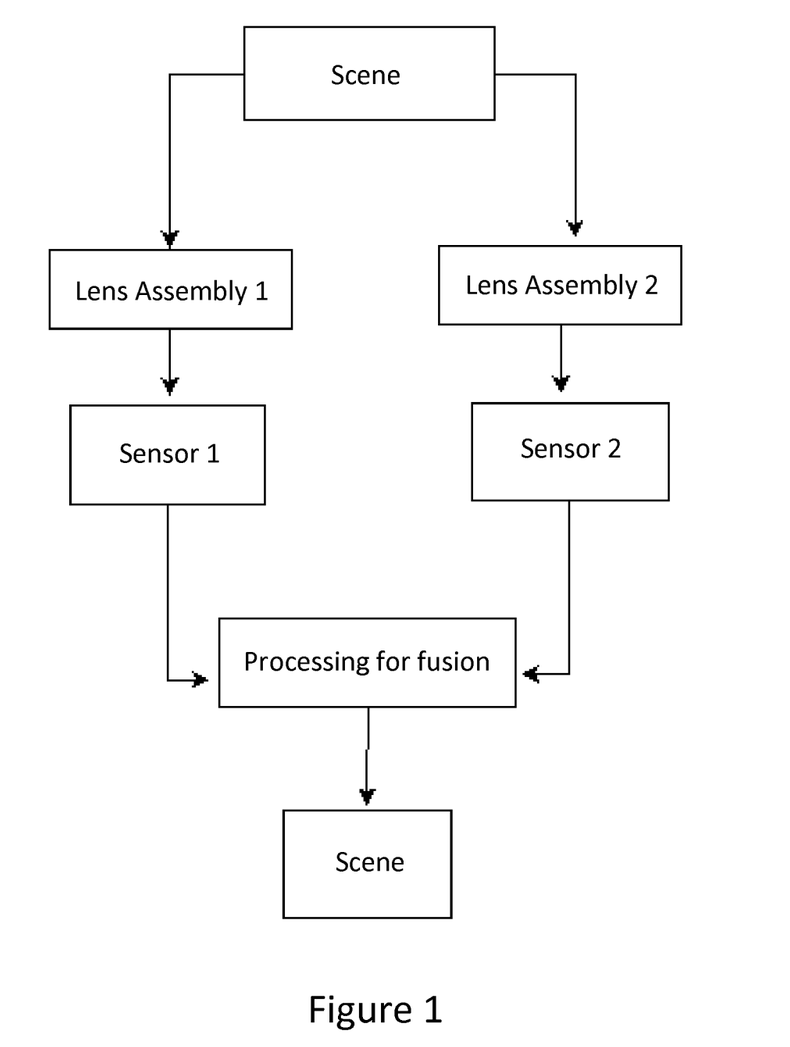
FIG. 1 shows a block diagram of a two-sensor fusion system, according to some embodiments.

FIG. 1 shows a block diagram for a basic multi sensor system with two sensors (e.g. a day camera and a LWIR camera), with fusion capabilities, according to some embodiments. Inputs from the two sensors may be fused using digital image processing to create a combined output. In the absence of the proposed optical alignment method, complex image registration techniques may be necessitated to correct for alignment errors between them.

Components

A device according to various embodiments may include one or more electronic, computer, logical, and/or other suitable components. A device may include processor, central processing unit, graphics processing unit, controller, logic circuit, digital signal processor, or any other suitable component. Such a component (e.g., a processor) may be used to execute instructions (e.g., program instructions, logical operations, etc.) and direct one or more other device components to operate in accordance with one or more embodiments.

A device according to various embodiments may include a storage device, solid state drive, hard disk, or any other suitable device. A storage device may store program instructions, files, images, and/or any other information or data used in various embodiments.

A device according to various embodiments may include a memory component, such as random access memory, and/or any other memory. The memory may allow the device to store transient data for use in various embodiments.

A device according to various embodiments may include a motherboard, power source (e.g., a battery, e.g., a transformer or convertor for grid power, etc.), fan, and/or any other suitable components.

Optical Alignment

Figure 2:
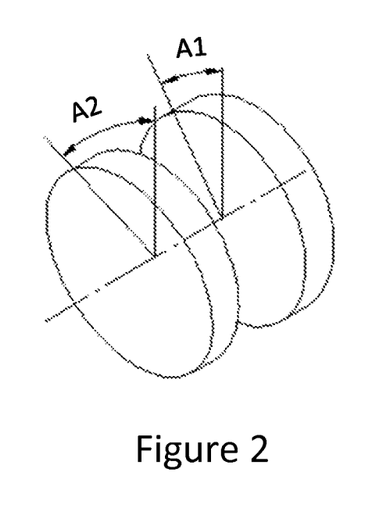
FIG. 2 shows a prism-pair oriented at different roll angles, according to some embodiments.

Various embodiments make use of a pair of prisms that can be independently rotated around a common axis. Assuming both the prisms shown in FIG. 2 have a prism angle 'W', refractive index 'n' and roll angles 'A1' and 'A2' (from the same reference line) respectively, the deviation of a beam of radiation in the yaw and pitch directions is given by the following well-known equations—

$$dx=[\arcsin(n*\sin(W))-W][\cos(A1)+\cos(A2)]$$

$$dy=[\arcsin(n*\sin(W))-W][\sin(A1)+\sin(A2)]$$

For example, assume both prisms have a refractive index n=1.5 and prism angle W=2 degrees. Let's also assume that the incident beam of radiation must be deviated by yaw (dx)=1 deg and pitch (dy)=1.5 deg. Setting the angular positions of the prisms 1 and 2 to A1=83 deg and A2=30 deg respectively achieves the required deviation.

Aligning Two Sensors

Figure 3:
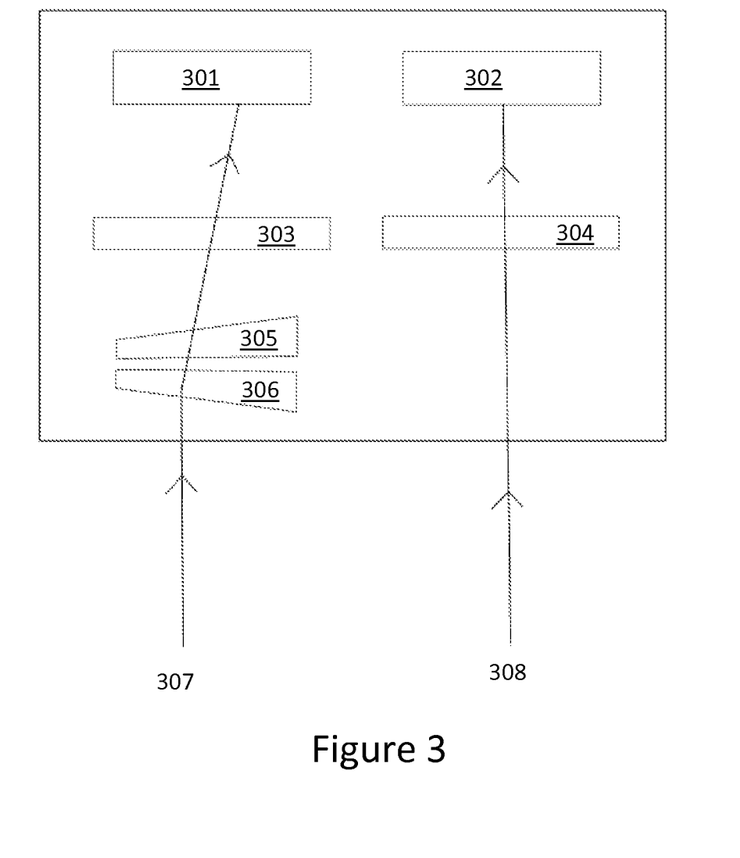
FIG. 3 shows a schematic of a two-sensor EO system with optical elements to correct for misalignment, according to some embodiments.
Figure 4:
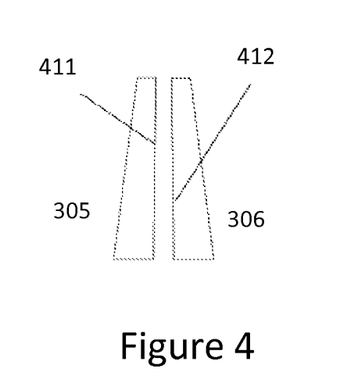
FIG. 4 shows a prism-pair with surfaces correctly aligned, according to some embodiments.

In FIG. 3, sensors 301 and 302 are two sensors in the multi-sensor system, 303 and 304 are suitable lens assemblies for the corresponding wavelengths, and items 305 and 306 form the optical system placed in the optical path of sensor 301. In some embodiments, the optical system may be a pair of prisms that function according to the principles outlined above. Based on the relative rotation between the two prisms, an incident beam of radiation is deflected before it falls onto the sensor. The axis of rotation of both the prisms coincides with the optical axis of the system. The prism surfaces may be coated with suitable agents such as VIS-NIR (Visible-Near Infrared) to control the wavelengths being transmitted. In various embodiments, surfaces 411 and 412 of the two prisms (e.g., 305 and 306) face each other, which may optimize deflection, as shown in FIG. 4.

The desired deflection may be controlled by setting the rotational positions 'A1' and 'A2' of the two prisms, as shown in FIG. 2. Once an alignment has been achieved, the two prisms may be locked to prevent further rotations. Inputs from sensors 301 and 302 may now be fused using basic digital image processing to obtain a combined output free from alignment errors.

Figure 5:
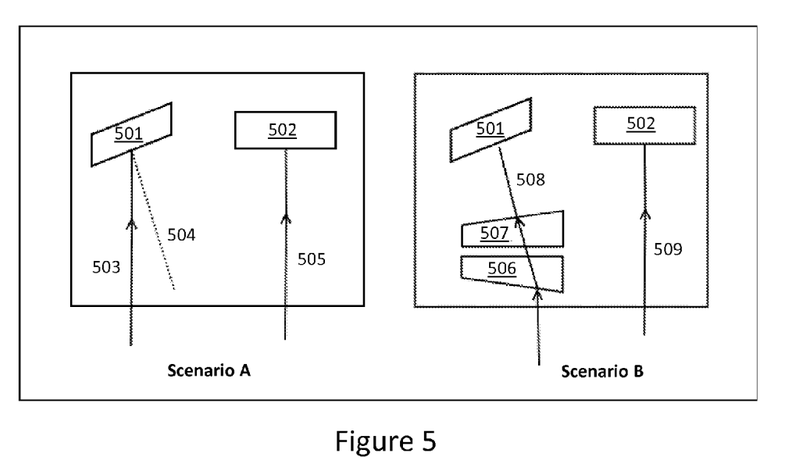
FIG. 5 shows how various embodiments can be used to correct for angular disparity.

FIG. 5, at Scenario A, shows a system where the optical axis 504 of sensor 501 is misaligned with respect to that of sensor 502. Sample ray 505 from a beam of radiation incident on the system is parallel to the optical axis of sensor 502, but ray 503 is not parallel to the optical axis of sensor 501. As a result, the respective outputs are mismatched. Scenario B shows how a combination of optical elements 506 and 507, which may be a prism pair, is used to deflect the ray 508 before it falls on sensor 501 such that it becomes parallel to the optical axis of sensor 501, thereby eliminating angular disparities between the two outputs.

Alignment Process

There are various ways to perform the alignment process. Methods according to some embodiments use reference targets with distinct features (say, a square grid) that are visible in the spectral wavebands being imaged. In various embodiments where the optical elements are prisms as described above, one may overlay the outputs from sensors 501 and 502 while manually rotating the prisms until the reference target is exactly overlaid in both feeds. This process may be aided by a computer program that extracts features from the reference target and specifies when the angular disparity between the sensors has been eliminated. Methods according to various embodiments provide for automatic rotation of the prisms, where the prisms can be set to precise angular positions with the help of actuators such as motors. A computer program may be used to calculate the angular disparity between the sensors by examining images of the reference target. It may also calculate the angular positions of the prisms that will offset the angular disparity by solving the non-linear equations specified above. It may then operate the actuators to set the prisms to these angular positions. Once alignment has been achieved, the prisms may be locked by clamping or bolting down their housings, or by some other mechanism. The sensors may get misaligned again after prolonged use in the field, and in such an event, the process may simply be repeated to realign the sensors.

Aligning Multi-Sensor Systems with a Plurality of Sensors

Figure 6:
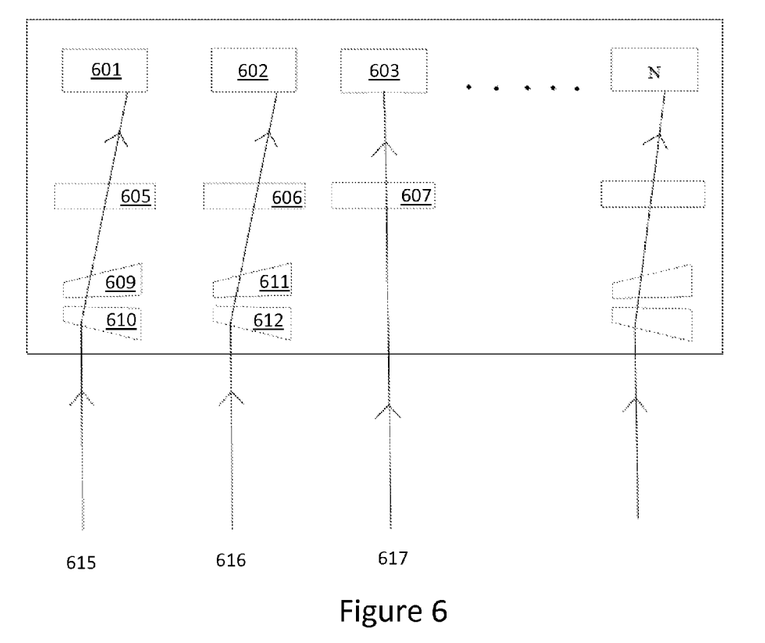
FIG. 6 shows a schematic of a multi-sensor system with a plurality of sensors, according to some embodiments.

FIG. 6 shows a multi-sensor EO system with a plurality of sensors 601 to N, which can include any of the following—visible, mid-wave infrared (MWIR), long-wave infrared (LWIR), laser range finder (LRF), laser displacement (LD), Digital Image Intensifiers, or any other suitable sensors. Methods according to various embodiments can be used to align inputs from all these sensors for accurate fusion of complementary features. In this situation, one sensor is chosen as the frame of reference (e.g., sensor 603 in FIG. 6), and methods described herein are used to align all other sensors with the reference according to the principles outlined above. The materials for optical elements may be suitably chosen for the specific band of incident wavelengths they are supposed to transmit.

Various embodiments thus provide a way of aligning multiple sensors in a multi-sensor EO system without involving expensive computation and complex mechanical adjustments.

Figure 7:
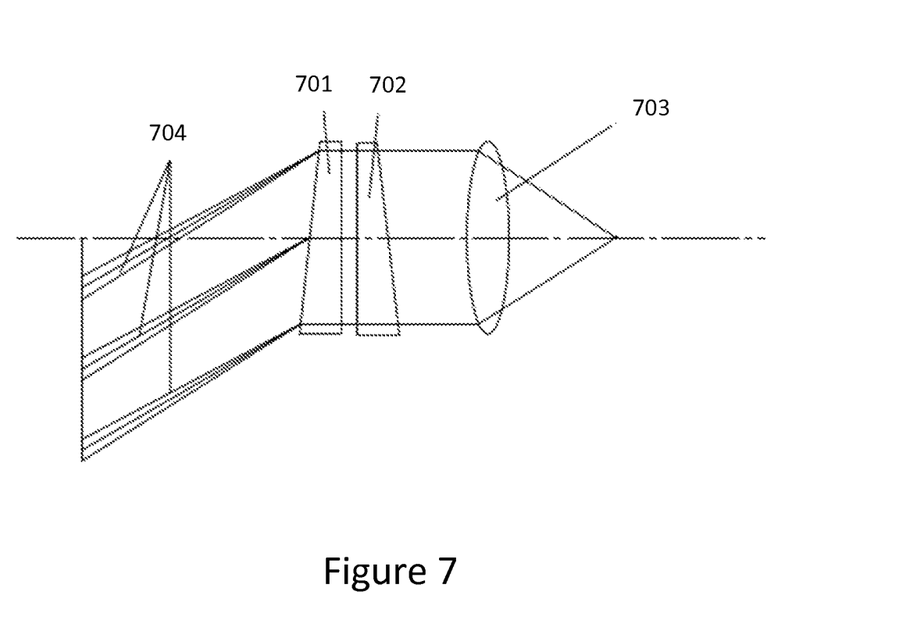
FIG. 7 shows the beam-deflection action of the optical elements, according to some embodiments.

FIG. 7 shows the beam-deflection action of the optical elements, according to some embodiments. Incident beams 704, which are initially not parallel to the optical axis of a sensor, may be deflected by optical elements 701 and 702, before reaching a lens assembly 703, at which point they are parallel to the optical axis of the sensor.

Other Optical Combinations

Figure 8:
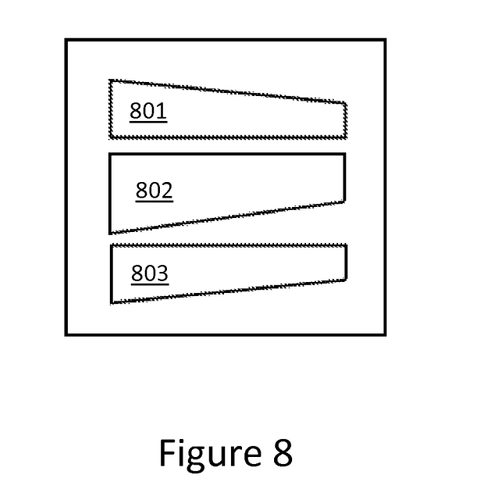
FIG. 8 shows a 3-element optical system, according to some embodiments.

Various other embodiments may employ optical combinations not limited to two prisms. FIG. 8 shows an optical combination with three prisms, 801, 802, and 803. Other combinations may employ elements like lenses, mirrors and other prisms based on the precision, quantum and direction of deviation required.

INCORPORATIONS BY REFERENCE

United States patent application 20130107072, entitled "Multi-resolution ip camera", published May 2, 2013, is hereby incorporated by reference herein for all purposes.

United States patent application 20070247517, entitled "Method and apparatus for producing a fused image", published Oct. 25, 2007, is hereby incorporated by reference herein for all purposes.

EMBODIMENTS

The following are embodiments, not claims:

A. A device comprising:
a first prism assembly including a first prism with first and second faces and a second prism with third and fourth faces, in which:
the first and second prisms are aligned along a common axis;
the first face is not perpendicular to the axis; and
the first prism is independently rotatable about the axis;
a first sensor disposed at a first end of the first prism assembly;
a processor; and
a housing that encloses at least the first prism assembly, the housing permitting entry of electromagnetic radiation at a second end of the first prism assembly.

In various embodiments, the first sensor may be enclosed within the housing. In various embodiments, the first sensor may be fixed to the inside of the housing.

A.7. The device of embodiment A, in which the common axis is the optical axis of the prism assembly.

A.0. The device of embodiment A in which the second and third faces are parallel to one another and proximate to one another.

A.0.1 The device of embodiment A in which the second and third faces are both perpendicular to the common axis.

A.1. The device of embodiment A in which the second and third faces are in contact.

A.2. The device of embodiment A in which the second prism is independently rotatable about the common axis.

A.3. The device of embodiment A in which the sensor is one of: (a) an optical sensor; (b) an infrared sensor; (c) a mid-wave infrared sensor; (d) a long wave infrared sensor; (e) a laser range finder; (f) a laser displacement sensor; and (g) a digital image intensifier.

A.4. The device of embodiment A further comprising a first actuator that is coupled to the first prism, wherein the actuator may be manipulated by a human operator to effect the rotation of the first prism about the common axis.

In various embodiments, the first actuator may include a rotating knob with a gear assembly geared to an edge of the first prism. When a human rotates the knob, the gear assembly may translate the rotational motion to the prism.

A.4.1. The device of embodiment A.4 further comprising a second actuator that is coupled to the second prism, wherein the second actuator may be manipulated by a human operator to effect the rotation of the second prism about the common axis.

A.5. The device of embodiment A further comprising a first motor that is coupled to the first prism and capable of driving the rotation of the first prism about the common axis.

A.5.1. The device of embodiment A.5 further comprising a second sensor, in which the processor executes instructions to:
receive a first reading from the first sensor;
receive a second reading from the second sensor;
determine a disparity between the first reading and the second reading; and
cause the first motor to rotate the first prism in such a way as to reduce the disparity.

A.5.1.1. The device of embodiment A.5.1 further comprising a second motor, in which the processor further executes instructions to cause the second motor to rotate the second prism in such a way as to reduce the disparity.

A.5.1.2. The device of embodiment A.5.1 in which the first reading is a first image captured of a reference target, and in which the second reading is a second image captured of the same reference target.

A.8. The device of embodiment A further comprising a second motor that is coupled to the second prism and capable of driving the rotation of the second prism about the common axis.

A.9. The device of embodiment A further comprising a second sensor and a memory, in which the memory stores instructions and the processor executes the instructions to:
receive a first reading from the first sensor;
receive a second reading from the second sensor; and
determine a composite reading based on the first and second readings.

A.9.1. The device of embodiment A.9 in which, in determining a composite reading, the processor executes instructions to determine a composite image.

In various embodiments, a composite image may be a fused image, which may include details from both the first and second readings.

A.10. The device of embodiment A further comprising a display screen.

In various embodiments, the display screen may be affixed to, or built into the housing and may be visible external to the housing. The display screen may be used to show one or more images captured by one or more sensors.

A.10.1. The device of embodiment A.10 in which the display screen displays a first image received by the first sensor.

A.10.1.1. The device of embodiment A.10.1 further comprising a second sensor, in which the display screen further displays a second image received by the second sensor overlaid on top of the first image.

A.6. The device of embodiment A further comprising:
a second prism assembly comprising a third prism and fourth prism;
a second sensor disposed on one end of the second prism assembly; and
a third sensor.

A.11. The device of embodiment A in which the first face includes a coating that controls the transmission of certain wavelengths.

A.11.1. The device of embodiment A.11 in which the coating is VIS-NIR.

A.12. The device of embodiment A further comprising a locking mechanism that, when activated, prevents rotation of the first prism about its axis.

As will be appreciated, the present description represents some embodiments, but contemplated embodiments are not limited to those explicitly described herein.

It will be appreciated that any titles, headings, section headings, and the like used herein may be used for convenience or reference, but are not intended to be restrictive or limiting in any way. Descriptions appearing under or following a given heading are not intended to be limited in scope or in any other way by the heading.

It will be appreciated that various embodiments described herein are not limited in scope to the description appearing under the SUMMARY section, nor to the description appearing under the ABSTRACT section, nor to the description appearing in any other particular section.

The invention claimed is:

1. A device comprising:
a first prism assembly including a first prism with first and second faces and a second prism with third and fourth faces, in which:
the first and second prisms are aligned along a common axis;
the first face is not perpendicular to the axis; and
the first prism is independently rotatable about the axis,
a first sensor disposed at a first end of the first prism assembly;
a second sensor;
a memory, in which the memory stores instructions;
a processor, in which the processor executes the instructions to:
receive a first reading from the first sensor;
receive a second reading from the second sensor; and
determine a composite image based on the first and second readings, and
a housing that encloses at least the first prism assembly, the housing permitting entry of electromagnetic radiation at a second end of the first prism assembly.

2. A device comprising:
a first prism assembly including a first prism with first and second faces and a second prism with third and fourth faces, in which:
the first and second prisms are aligned along a common axis;
the first face is not perpendicular to the axis; and
the first prism is independently rotatable about the axis,
a first sensor disposed at a first end of the first prism assembly;
a second sensor;
a first motor that is coupled to the first prism and capable of driving the rotation of the first prism about the common axis;
a processor, in which the processor executes instructions to:
receive a first reading from the first sensor;
receive a second reading from the second sensor;
determine a disparity between the first reading and the second reading; and
cause the first motor to rotate the first prism in such a way as to reduce the disparity, and
a housing that encloses at least the first prism assembly, the housing permitting entry of electromagnetic radiation at a second end of the first prism assembly.

3. The device of claim 2 further comprising a second motor, in which the processor further executes instructions to cause the second motor to rotate the second prism in such a way as to reduce the disparity.

4. The device of claim 2 in which the first reading is a first image captured of a reference target, and in which the second reading is a second image captured of the same reference target.

5. A device comprising:
a first prism assembly including a first prism with first and second faces and a second prism with third and fourth faces, in which:
the first and second prisms are aligned along a common axis;
the first face is not perpendicular to the axis; and
the first prism is independently rotatable about the axis,
a first sensor disposed at a first end of the first prism assembly;
a processor;
a housing that encloses at least the first prism assembly, the housing permitting entry of electromagnetic radiation at a second end of the first prism assembly;
a display screen, in which the display screen displays a first image received by the first sensor; and
a second sensor, in which the display screen further displays a second image received by the second sensor overlaid on top of the first image.

* * * * *